United States Patent
Li et al.

(10) Patent No.: US 10,977,070 B2
(45) Date of Patent: Apr. 13, 2021

(54) CONTROL SYSTEM FOR MICROKERNEL ARCHITECTURE OF INDUSTRIAL SERVER AND INDUSTRIAL SERVER COMPRISING THE SAME

(71) Applicant: KYLAND TECHNOLOGY CO., LTD, Beijing (CN)

(72) Inventors: Ping Li, Beijing (CN); Zhiwei Yan, Beijing (CN); Qiyun Jiang, Beijing (CN); Xueqiang Qiu, Beijing (CN); Xingpei Tang, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 152 days.

(21) Appl. No.: 16/243,438

(22) Filed: Jan. 9, 2019

(65) Prior Publication Data
US 2020/0012507 A1    Jan. 9, 2020

(30) Foreign Application Priority Data
Jul. 9, 2018 (CN) .......................... 201810745322.7

(51) Int. Cl.
*G06F 9/455* (2018.01)
*G06F 9/48* (2006.01)

(52) U.S. Cl.
CPC ........ *G06F 9/45558* (2013.01); *G06F 9/4887* (2013.01); *G06F 2009/45591* (2013.01)

(58) Field of Classification Search
CPC ............................ G06F 9/4558; G06F 9/4887
See application file for complete search history.

(56) References Cited

U.S. PATENT DOCUMENTS

| | | | |
|---|---|---|---|
| 8,776,050 B2 | 7/2014 | Plouffe et al. | |
| 2010/0251265 A1* | 9/2010 | Hodson | G06F 9/5077 719/319 |
| 2016/0371118 A1 | 12/2016 | Dhanraj et al. | |
| 2018/0373441 A1* | 12/2018 | Nassi | G06F 3/067 |

FOREIGN PATENT DOCUMENTS

| | | |
|---|---|---|
| CN | 107102894 A | 8/2017 |
| CN | 107506234 A | 12/2017 |
| CN | 107624181 A | 1/2018 |

OTHER PUBLICATIONS

Koen Bijn, Extended European Search Report, EP Application No. 19151214, dated Nov. 18, 2019, 9 pages, Patent Office, Munich Germany European.
Raj Kumar, Examination Report, Indian Patent Application No. 201924001936, dated Dec. 23, 2020, 7 pages, Intellectual Property India, India.

* cited by examiner

*Primary Examiner* — Tammy E Lee
(74) *Attorney, Agent, or Firm* — Crain Caton and James

(57) ABSTRACT

Provided is a microkernel architecture control system of an industrial server and an industrial server, which relate to the technical field of industrial servers. According to the microkernel architecture control system, scheduling configuration information is customized on the basis of an architecture including a plurality of microkernels and a virtual machine monitor prior to startup of a system, each microkernel including industrial control middleware and a real-time operating system.

20 Claims, 4 Drawing Sheets

US 10,977,070 B2

CONTROL SYSTEM FOR MICROKERNEL ARCHITECTURE OF INDUSTRIAL SERVER AND INDUSTRIAL SERVER COMPRISING THE SAME

CROSS-REFERENCE TO RELATED APPLICATIONS

This application claims priority to a Chinese patent application No. 201810745322.7, filed by the applicant "KYLAND TECHNOLOGY CO., LTD" on Jul. 9, 2018 and entitled "CONTROL SYSTEM FOR MICROKERNEL ARCHITECTURE OF INDUSTRIAL SERVER AND INDUSTRIAL SERVER COMPRISING THE SAME", the disclosure of which is incorporated herein by reference in its entirety.

TECHNICAL FIELD

The embodiments of the present disclosure relate to the technical field of industrial servers and, in particular, to a control system for microkernel architecture of industrial server and an industrial server.

BACKGROUND

A virtual operating system (e.g., Core i7) based on industrial server hardware supports four physical cores. One virtual machine, that is, one micro-control kernel including a Programmable Logic Controller (PLC), runs on each core.

However, that only one PLC can run on one core wastes resources and also limits executable functions. In addition, the scheduling mode of multi-core PLC includes a priority-based scheduling algorithm applied in service scenarios with high real-time requirements and a timetable-based scheduling algorithm applied in service scenarios with low real-time requirements. In a scenario with complex service requirements, any of the above scheduling algorithms can hardly meet users' service requirements and would cause low utilization of CPU resources. At a conventional industrial site, only one PLC control system runs on one hardware platform, making functions fixed and unchangeable; and once a plurality of control systems (PLC/DCS/Motion/CNC) are involved, the management and maintenance would be difficult and inefficient.

SUMMARY

The embodiments of the present disclosure provide a control system for microkernel architecture of industrial server and an industrial server, to achieve the real-time control and free combination of the microkernels of the industrial server at the industrial site layer, simplify hardware equipment, reduce construction and maintenance costs and achieve the software-defined industrial process.

In a first aspect, the embodiments of the present disclosure provide a control system for microkernel architecture of industrial server. An operating system kernel based on industrial server hardware supports a plurality of physical cores. The system includes multiple microkernels and a virtual machine monitor.

Each physical core runs more than one microkernels, and each microkernel includes industrial control middleware and a real-time operating system.

The industrial control middleware is configured to analyze the requirements of an industrial control application and run the industrial control application.

The real-time operating system is configured to schedule and control, through the virtual machine monitor, a control program in the operation process of industrial application.

The virtual machine monitor is configured to, prior to startup of a system, generate scheduling configuration information according to a microkernel task type weight and a microkernel task priority weight and/or a control program running time weight corresponding to each control program, configure the control programs running on the operating system kernel according to the scheduling configuration information, and start the configured control programs. The scheduling configuration information comprises the number of control programs running on each physical core, a scheduling algorithm for the control programs running on each physical core, and at least one control program running on more than one physical cores.

In an embodiment, each microkernel further includes an input/output (I/O) communication module. The I/O communication module is configured to, in the running process of the industrial control application, communicate with a terminal controlled by the industrial server based on a communication drive in the real-time operating system and a communication protocol in the industrial control middleware.

In an embodiment, the virtual machine monitor is specifically configured to:

calculate dependency among the control programs according to the microkernel task type weight and the microkernel task priority weight and/or the control program running time weight corresponding to each control program; and generate the scheduling configuration information according to the dependency.

In an embodiment, the virtual machine monitor is specifically configured to:

calculate dependency according to the microkernel task type weight, the microkernel task priority weight and the control program running time weight; or calculate the dependency according to the microkernel task type weight and the microkernel task priority weight; or calculate the dependency according to the microkernel task type weight and the control program running time weight.

In an embodiment, the virtual machine monitor is specifically configured to:

virtualize hardware through a virtual monitor, and configure the more than one control program on at least one physical core according to the scheduling configuration information; and/or, configure the scheduling algorithms for all the control programs running on each physical core according to the scheduling configuration information, where the scheduling algorithm includes a timetable-based scheduling algorithm or a priority-based scheduling algorithm; and/or, virtualize the plurality of physical cores, obtain at least two control programs from each control program and configure the obtained at least two control programs originating from each control program on more than one physical core according to the scheduling configuration information.

In an embodiment, the virtual machine monitor is specifically configured to:

generate the scheduling configuration information according to a microkernel task type, and a microkernel task priority and/or a control program running time of each control program by using a coarse-grained lock scheduling method; where in the coarse-grained lock scheduling method, each physical core corresponds to one lock, one control program is determined from the control programs on a single one of the plurality of physical cores according to a timetable-based scheduling algorithm or a priority-based scheduling algorithm, the control program obtains the lock corresponding to the single one of the plurality of physical cores, exclusively occupies the single one of the plurality of physical cores, and executes a kernel mode operation; or generate the scheduling configuration information according to the microkernel task type, and the microkernel task priority and/or the control program running time of each control program by using a fine-grained lock scheduling method; where in the fine-grained lock scheduling method, each physical core corresponds to one lock, control programs are obtained from the one control program according to computing resources required by the at least one control program and are configured on respective ones of the plurality of physical cores according to dependency among the control programs, each control program acquire a lock corresponding to the respective one of the plurality of physical cores running the each control program, the control programs having locks currently execute the kernel mode operation on the respective ones of the plurality of physical cores running the control programs so as to be executed in parallel.

In an embodiment, the timetable-based scheduling algorithm includes:

setting a plurality of timers, where a duration of a first timer is a main frame time, a second timer is sequentially started for each of a plurality of time windows within the main frame time, and a duration of the second timer is the same as a duration of each time window successively; and scheduling a control program according to a timetable while starting the first timer and the second timer with a main frame time as a period, scheduling a next control program once the second timer expires, and starting a next period once the first timer expires, where the timetable includes start time and end time of each time window and the respective control programs corresponding to the plurality of time windows.

In an embodiment, the priority-based scheduling algorithm includes:

traversing a priority primary index number bitmap to determine a primary index number corresponding to a highest priority;

traversing a priority secondary index number bitmap corresponding to the primary index number to determine a secondary index number corresponding to a highest priority; and calculating the highest priority based on the primary index number and the secondary index number, and determining a control program corresponding to a highest priority.

In an embodiment, control programs running on the more than one physical core have a same running period or different running periods.

In a second aspect, the embodiments of the present disclosure further provide an industrial server, which includes: industrial server hardware and an operating system kernel based on the industrial server hardware, where the operating system kernel supports a plurality of physical cores. The industrial server further includes a control system for microkernel architecture of industrial server according to any embodiment of the present disclosure.

At a conventional industrial site, only one PLC control system runs on one hardware platform, making functions fixed and unchangeable, and once a plurality of control systems (PLC/DCS/Motion/CNC) are involved, the management and maintenance would be difficult and inefficient.

The embodiments are based on an architecture including a plurality of microkernels and a virtual machine monitor, each microkernel including industrial control middleware and a real-time operating system. The virtual machine monitor customizes the number of control programs running on each physical core, the scheduling algorithm for each physical core, and each control program running on multiple physical cores prior to startup of a system. A customized configuration is not limited to a single physical core controlling a plurality of microkernel time slices and a single microkernel occupying computing resources to perform an allocation across physical cores. The present disclosure achieves the real-time control and free combination of microkernels of the industrial server at the industrial site layer, which simplifies hardware equipment, reduces construction and maintenance costs and achieves the software-defined industrial process.

DETAILED DESCRIPTION

The embodiments of the present disclosure will be described hereinafter in detail with reference to the accompanying drawings and embodiments. It is to be understood that the specific embodiments described herein are merely to illustrate the embodiments of the present disclosure, and not to limit the embodiments. It is to be further noted that for convenience of description, only some but not all structures related to the embodiments of the present disclosure are shown in accompanying drawings.

At a conventional industrial site, only one PLC control system runs on one hardware platform, making functions fixed and unchangeable, and once a plurality of control systems (PLC/DCS/Motion/CNC) are involved, the management and maintenance would be difficult and inefficient. The embodiments of the present disclosure customize the scheduling configuration information on the basis of an architecture including a plurality of microkernels and a virtual machine monitor prior to startup of a system, each microkernel including industrial control middleware and a real-time operating system. The present disclosure achieves the real-time control and free combination of microkernels of the industrial server at the industrial site layer, which simplifies hardware equipment, reduces construction and maintenance costs and achieves the software-defined industrial process.

Embodiment 1

Figure 1:
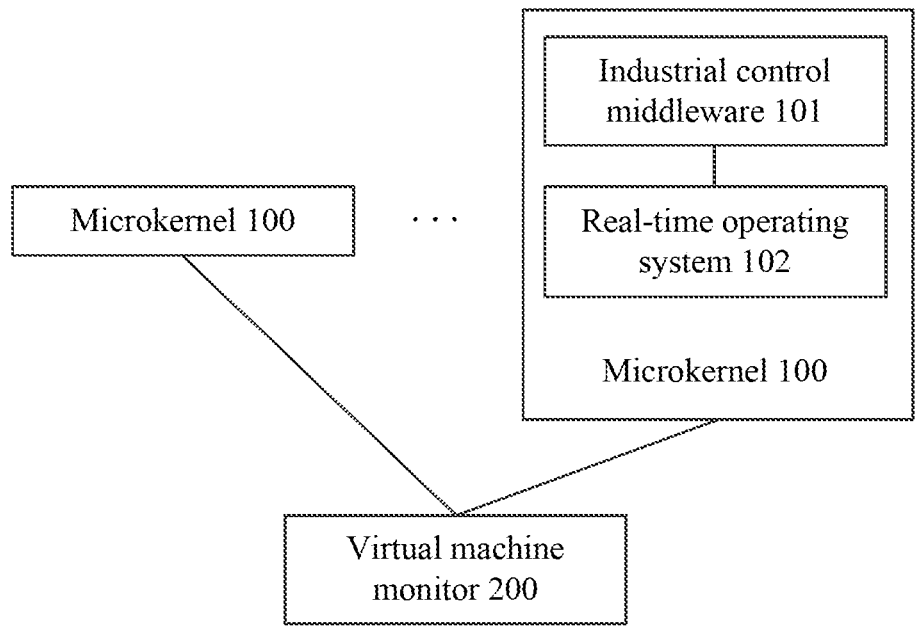
FIG. 1 is a structural diagram of a control system for microkernel architecture of industrial server according to an embodiment 1 of the present disclosure.
Figure 2:
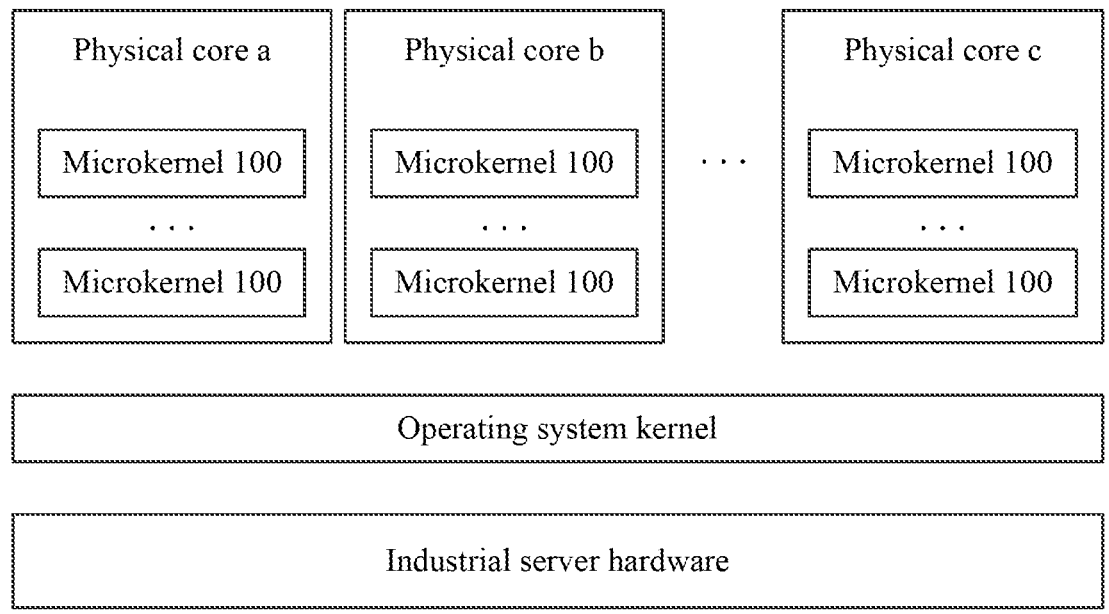
FIG. 2 is a structural diagram of the industrial server according to the embodiment 1 of the present disclosure.

FIG. 1 is a structural diagram of a control system for microkernel architecture of industrial server according to an embodiment 1 of the present disclosure. The system is disposed in an industrial server. FIG. 2 is a structural diagram of the industrial server according to the embodiment 1 of the present disclosure. The industrial server includes: industrial server hardware, an operating system kernel based on the industrial server hardware, and a plurality of physical cores supported by the operating system kernel. Each physical core may have multiple virtual machines running thereon, and each virtual machine corresponds to one microkernel. Control programs run on the microkernels, that is, more than one control programs may run on each physical core. In order to have multiple control programs running on one physical core, the embodiment of the present disclosure employs the virtualization technology to obtain multiple virtualized microkernels on the basis of the operating system. The control programs running on respective microkernels are scheduled by the operating system kernel. In an example, among a total of three physical cores a, b, and c, three control programs a1, a2 and a3 run on the physical core a, three control programs b1, b2 and b3 run on the physical core b, and three control programs c1, c2 and c3 run on the physical core c.

In the present embodiment, a kernel is a microkernel when part of content of services is removed from the kernel to outside. A microkernel operating system provides only the most basic and necessary services in the kernel, such as Inter-Process Communication (IPC), memory management and task scheduling. Other services, including drivers, file systems and networks, are implemented in the user mode. The service components run in respective independent address spaces instead of sharing an address space. Most microkernel operating systems process requests through message transmission between service modules. For example, a module sends a request for more memory space and transmits the request through the kernel to the service that processes the request. After the processing of the request is completed, a result is transmitted back through the kernel.

As shown in FIG. 1, the control system for microkernel architecture of industrial server includes: a plurality of microkernels 100 and a virtual machine monitor 200. Each physical core is capable of having multiple microkernels 100 running thereon. Each microkernel 100 includes industrial control middleware 101 and a real-time operating system 102. The virtual machine monitor 200 runs on an operating system kernel.

The industrial control middleware 101 is configured to analyze requirements of an industrial control application and run the industrial control application. The industrial control middleware is located between the microkernel operating system and the industrial control application, and provides running and development environment for the upper layer application software. Specifically, the industrial control middleware may analyze the industrial control application and run the industrial control application. The industrial server may run the industrial control application to control a corresponding terminal.

The real-time operating system 102 is configured to schedule and control, through the virtual machine monitor 200, a control program in the running process of industrial application.

The real-time operating system 102 in each microkernel provides only the most basic and necessary services, such as Inter-Process Communication (IPC), memory management and task scheduling.

The virtual machine monitor 200 is configured to: prior to startup of a system, generate scheduling configuration information according to a microkernel task type weight and a microkernel task priority weight and/or a control program running time weight corresponding to each control program of a plurality of control programs; configure the control programs running on the operating system kernel according to the scheduling configuration information; and start the configured control programs. The scheduling configuration information includes the number of control programs running on each physical core, a scheduling algorithm for control programs running on each physical core and at least one control program running on more than one of the physical cores. The microkernel task corresponding to a control program refers to a task for running the control program of the microkernel. The running time corresponding to a control program refers to a time slice allocated for the control program.

In the present embodiment, each physical core may have multiple control programs running thereon. The control programs have a same running period or different running periods. In an example, with reference to FIG. 3, three control programs run on each of physical cores a, b and c. Specifically, three control programs a1, a2 and a3 run on the physical core a; three control programs b1, b2 and b3 run on the physical core b; and three control programs c1, c2 and c3 run on the physical kernel c. Control programs a1, a2 and a3 may have the same running period, control programs b1, b2 and b3 may have different running periods, and running periods of control programs c1 and c2 are the same but are different from the running period of c3. The control programs running on each physical core may be scheduled with a configured scheduling algorithm. The scheduling algorithm includes a timetable-based scheduling algorithm or a priority-based scheduling algorithm. Different physical cores may be configured with different scheduling algorithms. One control program may run on one or more physical cores. It can be seen that one physical core may have multiple control programs running thereon, where each of the control programs may be a control program with complete functions or a control program with part of functions of one control program; when one control program is configured to run on multiple physical cores, the control program runs independently on each physical core, that is, the control program participates in the scheduling of each physical core running the control program; and different physical cores may be configured with different scheduling algorithms and do not affect each other.

A virtual machine monitor calculates the dependency of control programs according to the microkernel task type weight corresponding to each control program and the microkernel task priority weight corresponding to each control program and/or the control program running time weight corresponding to each control program, and generates scheduling configuration information according to the dependency. The calculation of the dependency includes: calculating the dependency according to the microkernel task type weight, the microkernel task priority weight and the control program running time weight; or calculating the dependency according to the microkernel task type weight and the microkernel task priority weight; or calculating the dependency according to the microkernel task type weight and the control program running time weight.

As mentioned above, each physical core may have multiple control programs running thereon. The control programs have a same running period or different running periods. That is, the control programs shares one physical core, and when one of the control programs needs to execute a kernel mode operation, the physical core serves this control program. In order to exclusively use the physical core, any control program that needs to execute the kernel mode operation is required to apply for a lock. Only the control program that has the lock can use the physical core to execute the kernel mode operation. According to the granularity size of computing resources required by the control programs, scheduling methods are classified into a coarse-grained lock scheduling method and a fine-grained lock scheduling method.

Figure 3:
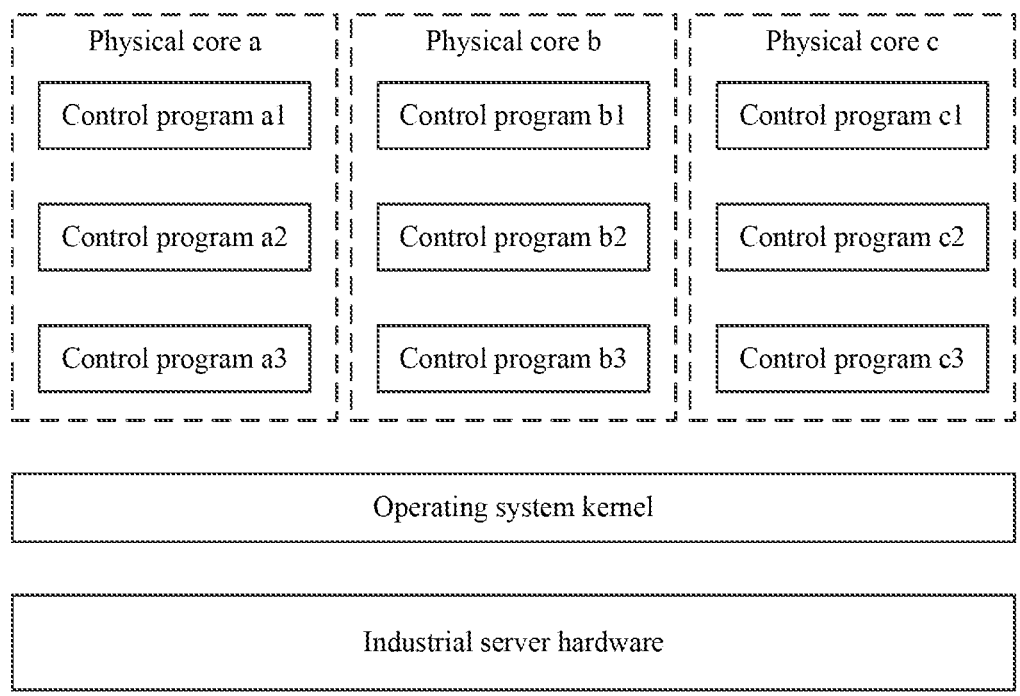
FIG. 3 is another structural diagram of the industrial server according to the embodiment 1 of the present disclosure.
Figure 4:
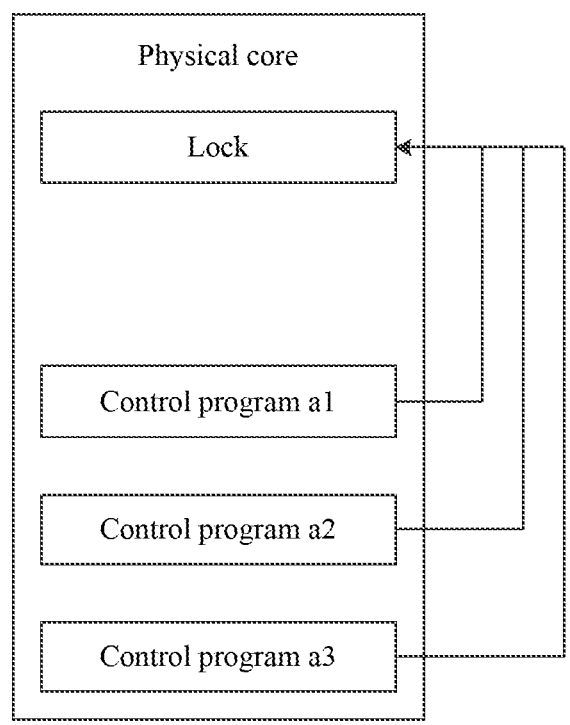
FIG. 4 is a schematic diagram of coarse-grained lock scheduling according to the embodiment 1 of the present disclosure.

FIG. 4 is a schematic diagram of coarse-grained lock scheduling according to the embodiment 1 of the present disclosure. The coarse-grained lock scheduling refers to that one physical core corresponds to one lock and the control program that has the lock exclusively occupies the entire physical core. Therefore, only one control program uses the physical core to execute the kernel mode operation at a time. Other control programs that need to execute the kernel mode operation can only wait to be scheduled to acquire the lock. When a coarse-grained lock scheduling method is adopted, the scheduling algorithm for the control programs on a single physical core includes the timetable-based scheduling algorithm or the priority-based scheduling algorithm. In an example, with reference to FIG. 3, there are a total of three physical cores a, b and c. Each physical core corresponds to one lock and the coarse granularity means that scheduling within a physical core is carried out on the basis of one complete control program. Three control programs a1, a2 and a3 run on the physical core a, and only one control program can use the physical core to execute the kernel mode operation at a time. The scheduling may be carried out among control programs a1, a2 and a3 on the basis of the timetable-based scheduling algorithm or the priority-based scheduling algorithm, to determine which control program acquires the lock of the physical core a. Similarly, the scheduling may be carried out among three control programs b1, b2 and b3 running on the physical core b, and among three control programs c1, c2 and c3 running on the physical core c in the above-mentioned way, so as to acquire the right of use of the locks corresponding to respective physical cores and then to occupy the physical core to execute the kernel mode operation.

Figure 5:
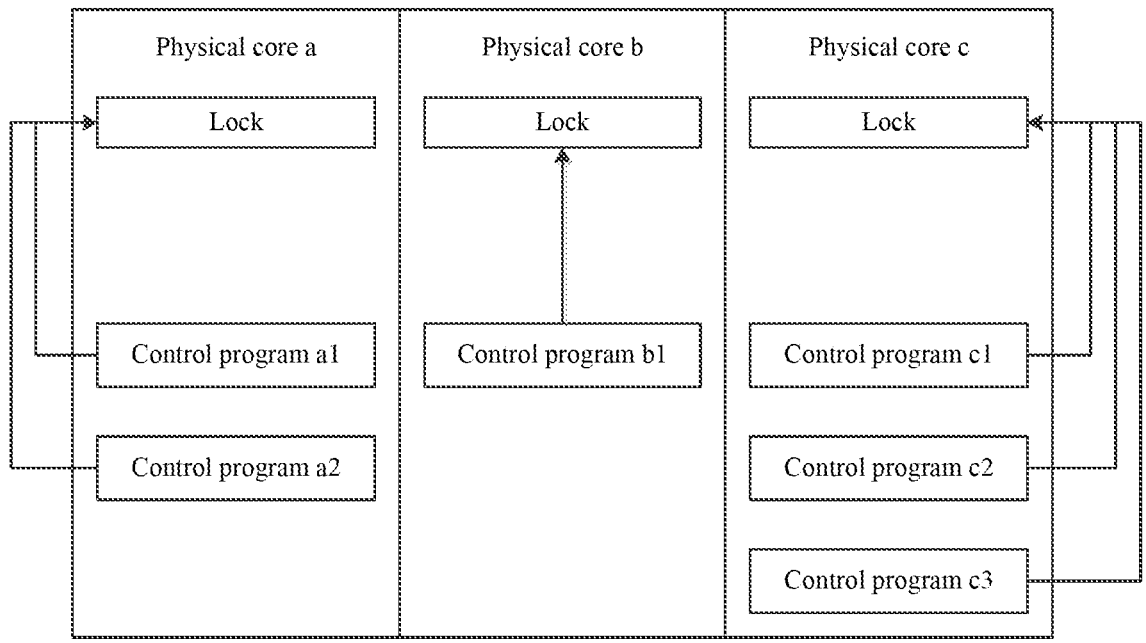
FIG. 5 is a schematic diagram of fine-grained lock scheduling according to the embodiment 1 of the present disclosure.

FIG. 5 is a schematic diagram of fine-grained lock scheduling according to the embodiment 1 of the present disclosure. When a control program needs a large number of computing resources of a kernel service, a kernel mode operation of the control program may be performed by multiple physical cores jointly. The single control program is divided into a plurality of control programs according to different granularities and the control programs are allocated to different physical cores. The physical cores simultaneously execute the kernel mode operation, such that the plurality of control programs is executed concurrently. Microkernel tasks may be classified into a plurality of types, including Inter-Process Communication (IPC), memory management and task scheduling. The present embodiment adopts a two-layer clipping algorithm to clip and classify control programs. The first layer clipping algorithm clips the plurality of control programs into as few schedulable period-controlled program sets as possible according to running time, which reduces the system overhead for scheduling control programs. The second layer clipping algorithm, based on the results of control program clipping on the first layer, further clips control programs into several control programs sets with different priority levels, which allows control programs to run in a more reliable and more real-time environment. Finally, dependency among the plurality of control programs is calculated. The calculation process may be performed in combination with the microkernel task type weight and the microkernel task priority weight and/or the control program running time weight. Control programs with high dependency are combined and allocated to the same physical core, and control programs with low dependency are allocated to different physical cores. The plurality of physical cores jointly executes the kernel mode operation to complete the control programs.

The clipping algorithm provided by the present embodiment is not limited to the two-layer clipping algorithm, and may further include the algorithm described below. For a control program, multiple control programs originate from the control program, and are clipped into several control programs with different priority levels, which allows the control programs to run in a more reliable and more real-time environment. Finally, the dependency of the control programs is calculated, the calculation process may be performed in combination with the microkernel task type weight and the microkernel task priority weight and/or the control program running time weight. Control programs with high dependency are combined and allocated to the same physical core, and control programs with low dependency are allocated to different physical cores. The plurality of physical cores jointly executes the kernel mode operation to complete the control programs.

In an example, with reference to FIG. 3, there are a total of three physical cores a, b and c. Each physical core corresponds to one lock and the fine granularity means that the plurality of control programs originate from one control program and then the plurality of control programs are allocated to different physical cores according to dependency between the control programs, each physical core scheduling a control program and other control programs together. Control programs b1, b2 and b3 run on the physical core b and control programs c1, c2 and c3 run on the physical core c, where b1 and b2 originate from a same control program, and c1 and c2 originate from a same control program. As mentioned above, the control programs may be split by using a two-layer clipping algorithm or other algorithms, and, according to the dependency, allocation is performed among physical cores where the control programs are located. That is, b1 and b2 are allocated to the same physical core b due to their high dependency, and c1 and c2 are allocated to the same physical core c due to their high dependency. Therefore, after the allocation based on the granularity of control programs, a same control program is allocated to two physical cores. Control programs within each physical core may be scheduled using the timetable-based scheduling algorithm or the priority-based scheduling algorithm, and a control program that acquires the right to use the lock will occupies the physical core to execute the kernel mode operation.

In an embodiment, the control programs corresponding to one control program are clipped into several control programs with different lengths of running time, which allows the control programs to run in a more reliable and more real-time environment. Finally, the dependency among the control programs is calculated, the calculation process may be performed in combination with the microkernel task type weight and the microkernel task priority weight and/or the control program running time weight. Control programs with high dependency are combined and allocated to the same physical core, and control programs with low dependency are allocated to different physical cores. The plurality of physical cores jointly executes the kernel mode operations to complete the control programs.

In general, control programs to be performed at the industrial site layer include but are not limited to: temperature measurement and control, humidity measurement and control, and process control. The dependency herein means that when the above-mentioned control program is implemented on microkernels, it is determined that control programs corresponding to the above-mentioned control program are completed on the basis of the microkernels. In fact, a micro control process acquired through a preset algorithm may be an industrial control process in accordance with the industrial site, or may be a user-defined industrial control process.

In the preset algorithm, for example, different weights are set for the microkernel task type, the control program running time and the microkernel task priority, and these weights are added up. The different sums of the weights, which are in a certain range, are considered to correspond to a same control program. The dependency is calculated through the preset algorithm, and control programs with high dependency are combined to determine the number of control programs running on each physical core and each control program running on the plurality of physical cores.

The scheduling configuration information includes the number of control programs running on each physical core, the scheduling algorithm for all control programs running on each physical core, and at least one control program running on more than one physical core. In the present embodiment, after it is determined which control programs are allocated to which physical cores according to the above method, scheduling configuration information is generated. In an example, with reference to FIG. 3, three control programs run on each of physical cores a, b and c. Specifically, three control programs a1, a2 and a3 run on the physical core a; three control programs b1, b2 and b3 run on the physical core b; and three control programs c1, c2 and c3 run on the physical kernel c. The physical core a determines from three control programs a1, a2, and a3 one control program currently executing the kernel mode operation by using the timetable-based scheduling algorithm. The physical kernel b determines from three control programs b1, b2, and b3 one control program currently executing the kernel mode operation by using the priority-based scheduling algorithm. The physical kernel c determines from three control programs c1, c2, and c3 one control program currently executing the kernel mode operation by using the priority-based scheduling algorithm. The control programs b1, b2, c1 and c2 originating from one control program run on two physical cores b and c respectively.

A virtual machine monitor 200 configures control programs running on the operating system kernel according to the scheduling configuration information. Specifically, the virtual machine monitor virtualizes hardware through a virtual machine monitoring program, and configures more than one control program on at least one of the plurality of physical cores according to the scheduling configuration information; and/or the virtual machine monitor configures the scheduling algorithm for all the control programs running on the each physical core according to the scheduling configuration information, the scheduling algorithm including a timetable-based scheduling algorithm or a priority-based scheduling algorithm; and/or the virtual machine monitor virtualizes the plurality of physical cores, obtains at least two control programs from each of the at least one control program and configures the obtained at least two control programs originating from each of the at least two control program on the more than one physical core according to the scheduling configuration information.

The virtual machine monitor may actually configure control programs running on the operating system kernel according to the scheduling configuration information. In an example, with reference to FIG. 3, three control programs run on each of physical cores a, b and c. Specifically, three control programs a1, a2 and a3 run on the physical core a; three control programs b1, b2 and b3 run on the physical core b; and three control programs c1, c2 and c3 run on the physical kernel c. The physical core a determines from three control programs a1, a2 and a3 one control program currently executing the kernel mode operation by using the timetable-based scheduling algorithm. The physical kernel b determines from three control programs b1, b2 and b3 one control program currently executing the kernel mode operation by using the priority-based scheduling algorithm. The physical kernel c determines from three control programs c1, c2 and c3 one control program currently executing the kernel mode operation by using the priority-based scheduling algorithm. The control programs b1, b2, c1 and c2 originating from one control program run on two physical cores b and c respectively.

After performing the configuration described above, the virtual machine monitor starts the configured control programs. In an example, with reference to FIG. 3, nine control programs are configured on three physical cores and are scheduled according to the scheduling algorithms corresponding to the respective physical cores.

Figure 6:
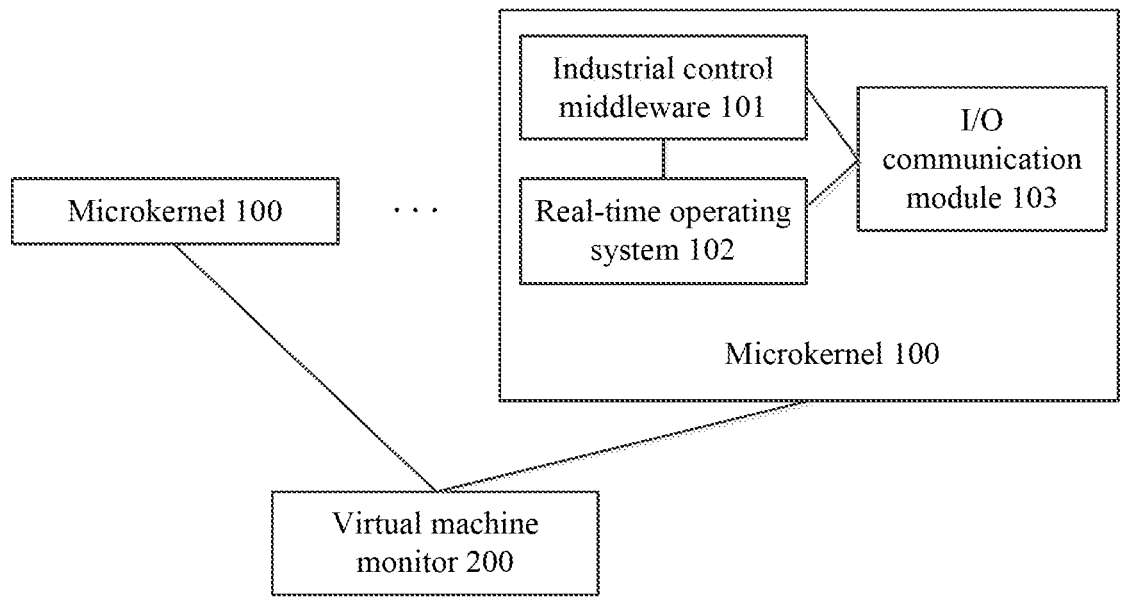
FIG. 6 is another structural diagram of the control system for microkernel architecture of industrial server according to the embodiment 1 of the present disclosure.

On the basis of the above, as shown in FIG. 6, a microkernel 100 further includes: an input/output (I/O) communication module 103, which is used for, in the running process of the industrial control application, communicating with a terminal controlled by the industrial server based on a communication drive in the real-time operating system 102 and a communication protocol in the industrial control middleware 101. The industrial server can communicate with the terminal on the basis of the microkernel through the cooperative use of the communication drive in the real-time operating system 102 and the communication protocol in the industrial control middleware 101.

In the present embodiment, one physical core may have multiple control programs running thereon, which improves the utilization of resources of the physical core; control programs with different periods may run on the same physical core, which achieves the free combination of control programs across a plurality of cores and the multi-service software-defined free scheduling; and different scheduling algorithms for control programs may be configured for different physical cores freely, which improves the flexibility and diversity of the scheduling of control programs.

The present embodiment is based on an architecture including a plurality of microkernels and a virtual machine monitor, each microkernel including industrial control middleware and a real-time operating system. The virtual machine monitor generates scheduling configuration information according to the microkernel task type weight and the microkernel task priority weight and/or the control program running time weight corresponding to each control program, configure the number of control programs, the scheduling algorithm running on each physical core and each control program running on the plurality of physical cores according to the scheduling configuration information prior to startup of a system. A customized configuration is not limited to a single physical core controlling a plurality of microkernel time slices and a single microkernel occupying computing resources to perform an allocation across physical cores. The present disclosure achieves the real-time control and free combination of the microkernel control of the industrial server at the industrial site layer, which simplifies hardware equipment, reduces construction and maintenance costs and achieves the software-defined industrial process.

Embodiment 2

On the basis of the above, the present embodiment illustrates a timetable-based scheduling algorithm. The timetable-based scheduling algorithm includes: setting a plurality of timers, where a duration of a first timer is a main frame time, a second timer is sequentially started for each of a plurality of time windows within the main frame time, and the duration of the second timer is the same as the duration of each time window successively; and scheduling a control program according to a timetable while starting the first timer and the second timer with a main frame time as a period, scheduling a next control program once the second timer expires, and starting a next period once the first timer expires, where the timetable includes start time and end time of each of the plurality of time windows and respective control programs corresponding to the time windows.

Figure 7:
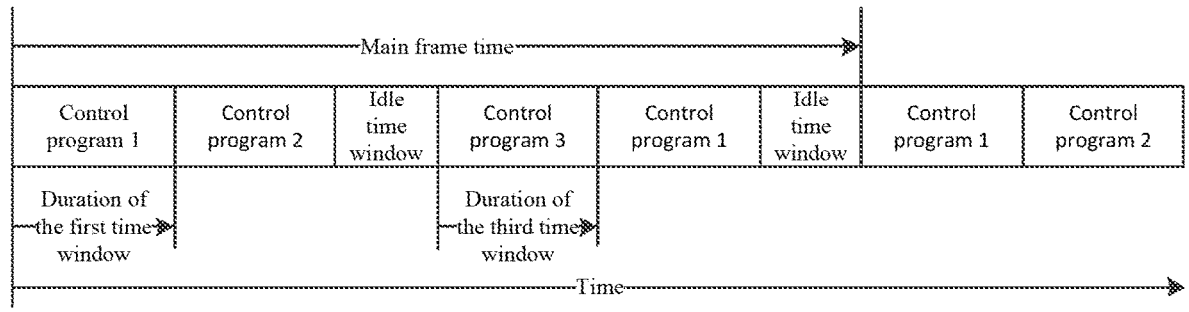
FIG. 7 is a schematic diagram of a timetable according to an embodiment 2 of the present disclosure.

In the present embodiment, control programs running on a physical core are scheduled according to the configured timetable. The timetable may be pre-configured according to requirements. The scheduling is performed by taking a main frame time as a period, the main frame including multiple time windows. The timetable includes start time and end time of the each time window, as well as control programs corresponding to respective time windows. The time windows are classified into non-idle time windows and idle time windows. Each non-idle time window corresponds to the running time of one control program, and no control program runs in the idle time window. When control programs are scheduled, the main frame time is repeatedly executed, that is, every time the timetable is finished, the first time window will be executed anew. FIG. 7 is a schematic diagram of a timetable according to an embodiment 2 of the present disclosure. In this timetable, the first non-idle time window is the running time of the control program 1, the second non-idle time window is the running time of the control program 2, the third non-idle time window is the running time of the control program 3, and the fourth non-idle time window is again the running time of the control program 1. The main frame time is the total duration of the six time windows of FIG. 7. Users may configure, according to actual requirements, the duration of each time window and the control programs running in each time window. The durations of the time windows may be configured to be the same or different.

However, since the timetable-based scheduling algorithm adopts the system clock, interruption may occur at small time intervals. The frequent occurrence of interruption may introduce delay to time windows of the timetable. For example, suppose that the main frame time of the timetable is 500 ms and the non-idle time window corresponding to the control program 1 is 100 ms, and suppose that the interruption processing time is 1 ms, if 10 interruptions occur during the running of the control program 1, then a delay of 10 ms is introduced, that is, the control program 1 runs for 110 ms before switching to the control program 2. Accordingly, when the main frame time of 500 ms expires, it is actually still in the last time window of the timetable and it will not switch back to the first time window of the timetable until 510 ms expires, resulting in a delay of 10 ms for main frame switching. To avoid the delay for control program switching and main frame switching, the plurality of timers are set in the present embodiment. The first timer is used for timing the main frame time to control the switching of the main frame time, and the second timer is used for timing the time windows to control the switching of the time windows. With reference to FIG. 7, when a main frame starts, the first timer and the second timer are started at the same time, the control program 1 corresponding to the first time window in the timetable is scheduled. At the moment, the duration of the second timer is the same as that of the first time window. When the second timer expires, the first time window in the timetable is switched to the adjacent second time window and the control program 2 corresponding to the second time windows is scheduled. At the moment, the duration of the second timer is as same as the duration of the second time window. The rest can be done in the same manner. When the first timer expires, a next main frame period is started, that is, the control program 1 corresponding to the first time window in the timetable is scheduled again. At the moment, the current time window, no matter which time window it is, switches to the first time window of the timetable, the first timer and the second timer are reset and restart, thereby achieving synchronization of the main frame time.

Embodiment 3

On the basis of the above, the present embodiment illustrates a priority-based scheduling algorithm. In the present embodiment, the priority of control programs running on one or more physical cores are acquired, and is represented by an 8-bit binary number, where the most significant 3 bits represent a primary index number, and the least significant 5 bits represent a secondary index number. The corresponding bits in the priority primary index number bitmap are marked according to the primary index number, and the corresponding bits in the priority secondary index number bitmap are marked according to the secondary index number.

Figure 8:
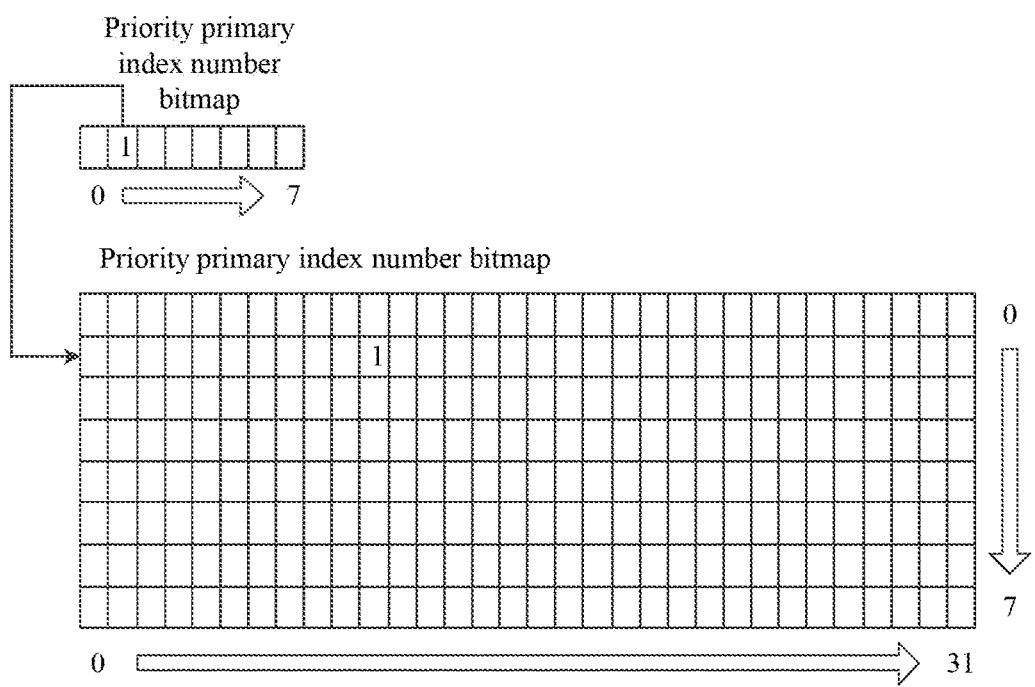
FIG. 8 is a schematic diagram of a priority index number bitmap according to an embodiment 3 of the present disclosure.

In the present embodiment, each control program may be provided with a priority, which may be set in a range from 0 to 255, where 0 corresponds to the highest priority and 255 corresponds to the lowest priority. Each control program may be in different states such as ready, wait, pending, suspend or hibernate. Only a control program in the ready state can be scheduled, and control programs in other states are not included in the list of objects to be scheduled. Each priority is represented by an 8-bit binary number, where the most significant 3 bits represent a primary index number, and the least significant 5 bits represent a secondary index number. For example, a control program with priority of 42, which is represented by a binary number 00101010, is in the ready state. The most significant 3 bits are 001(1) and the least significant 5 bits are 01010(10). The primary index number corresponding to the priority 42 is 1, and the secondary index number corresponding to the priority 42 is 10. FIG. 8 is a schematic diagram of a priority index number bitmap according to an embodiment 3 of the present disclosure. The priority primary index number bitmap is a 1×8 one-dimensional bitmap, in which the positions are numbered from 0 to 7. The priority secondary index number bitmap is an 8×32 two-dimensional bitmap, in which the positions are numbered from 0 to 7 in vertical direction, and from 0 to 31 in horizontal direction. The position numbered as 1 in the priority primary index number bitmap has a mark (of 1) according to the primary index number 1 corresponding to the priority 42; the position numbered as 1 in vertical direction and 10 in horizontal direction in the priority primary index number bitmap has a mark (of 1) according to the secondary index number corresponding to the priority 42.

On the basis of the above, a priority-based scheduling algorithm includes: traversing a priority primary index number bitmap to determine a primary index number corresponding to a highest priority; traversing a priority secondary index number bitmap corresponding to the primary index number to determine a secondary index number corresponding to the highest priority; calculating the highest according to the primary index number and the secondary index number, and determining a control program corresponding to the highest priority.

With reference to FIG. 8, the priority primary index number bitmap is traversed in the order of 0 to 7 to find that the position with the mark of 1 is numbered as 1; then the priority secondary index number bitmap is traversed in the order of 0 to 31 to find that the position, which has the mark of 1 and is numbered as 1 in vertical direction, is numbered as 10 in horizontal direction. According to the composition of the priority, the highest priority of the control program is 42 in this case.

It is to be noted that units and modules involved in the embodiment of the above mentioned apparatus are just divided according to functional logic, and the division is not limited to this, as long as the corresponding functions can be implemented. In addition, the specific names of the functional units are just intended for distinguishing, and are not to limit the protection scope of the embodiments of the present disclosure.

It is to be noted that the above are only preferred embodiments of the present disclosure and the technical principles used therein. It will be understood by those skilled in the art that the present disclosure is not limited to the specific embodiments described herein. Those skilled in the art can make various apparent modifications, adaptations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A control system for microkernel architecture of industrial server,
wherein an operating system kernel based on industrial server hardware in the industrial server supports a plurality of physical cores, the system comprises a plurality of microkernels and a virtual machine monitor,
wherein each physical core of the plurality of physical cores runs more than one of the plurality of microkernels, and each microkernel of the plurality of microkernels comprises:
industrial control middleware, which is configured to analyze requirements of an industrial control application and run the industrial control application; and
a real-time operating system, which is configured to schedule and control, through the virtual machine monitor, a control program of a plurality of control programs in a running process of the industrial control application; and
wherein the virtual machine monitor is configured to, prior to startup of the real-time operating system,
generate scheduling configuration information according to a microkernel task type weight and a microkernel task priority weight and/or a control program running time weight corresponding to each control program of the plurality of control programs;
configure the plurality of control programs running on the operating system kernel according to the scheduling configuration information; and
start the configured control programs,
wherein the scheduling configuration information comprises a number of control programs of the plurality of control programs running on the each physical core, a scheduling algorithm for all the control programs running on the each physical core, and at least one control program of the plurality of control programs running on more than one of the plurality of physical cores.

2. The system according to claim 1, wherein the each microkernel further comprises:
an input/output, I/O, communication module, which is configured to, in the running process of the industrial control application, communicate with a terminal controlled by the industrial server based on a communication drive in the real-time operating system and a communication protocol in the industrial control middleware.

3. The system according to claim 1, wherein the virtual machine monitor is specifically configured to:
calculate dependency among the plurality of control programs according to the microkernel task type weight and the microkernel task priority weight and/or the control program running time weight corresponding to the each control program; and
generate the scheduling configuration information according to the dependency.

4. The system according to claim 3, wherein the virtual machine monitor is specifically configured to:
calculate the dependency according to the microkernel task type weight, the microkernel task priority weight and the control program running time weight; or
calculating the dependency according to the microkernel task type weight and the microkernel task priority weight; or
calculating the dependency according to the microkernel task type weight and the control program running time weight.

5. The system according to claim 1, wherein the virtual machine monitor is specifically configured to:
virtualize hardware through a virtual machine monitoring program, and configure more than one of the plurality of control programs on at least one of the plurality of physical cores according to the scheduling configuration information; and/or
configure the scheduling algorithm for all the control programs running on the each physical core according to the scheduling configuration information, wherein the scheduling algorithm comprises a timetable-based scheduling algorithm or a priority-based scheduling algorithm; and/or virtualize the plurality of physical cores, obtaining at least two control programs from each of the at least one control program and configure the obtained at least two control programs originating from each of the at least one control program on more than one of the plurality of physical cores according to the scheduling configuration information.

6. The system according to claim 1, wherein the virtual machine monitor is specifically configured to:

generate the scheduling configuration information according to a microkernel task type, and a microkernel task priority and/or a control program running time of the each control program by using a coarse-grained lock scheduling method, wherein in the coarse-grained lock scheduling method, the each physical core corresponds to one lock, one control program is determined from the control programs on a single one of the plurality of physical cores according to a timetable-based scheduling algorithm or a priority-based scheduling algorithm, the control program obtains the lock corresponding to the single one of the plurality of physical cores, exclusively occupies the single one of the plurality of physical cores, and executes a kernel mode operation; or generate the scheduling configuration information according to the microkernel task type, and the microkernel task priority and/or the control program running time of the each control programs by using a fine-grained lock scheduling method, wherein in the fine-grained lock scheduling method, the each physical core corresponds to the one lock, control programs are obtained from the at least one control program according to computing resources required by the at least one control program and are configured on respective ones of the plurality of physical cores according to dependency among the control programs, each of the control programs acquire a lock corresponding to the respective one of the plurality of physical cores running the each of the control programs, the control programs having locks currently execute the kernel mode operation on the respective ones of the plurality of physical cores running the control programs so as to be executed in parallel.

7. The system according to claim 5, wherein the timetable-based scheduling algorithm comprises:

setting a plurality of timers, wherein a duration of a first timer is a main frame time, a second timer is sequentially started for each of a plurality of time windows within the main frame time, and a duration of the second timer is the same as a duration of each of the plurality of time windows successively; and scheduling the control programs according to a timetable while starting the first timer and the second timer with the main frame time as a period, scheduling a next one of the control programs once the second timer expires, and starting a next period once the first timer expires, wherein the timetable includes start time and end time of each of the plurality of time windows and the respective control programs corresponding to the plurality of time windows.

8. The system according to claim 5, wherein the priority-based scheduling algorithm comprises:

traversing a priority primary index number bitmap to determine a primary index number corresponding to a highest priority;

traversing a priority secondary index number bitmap corresponding to the primary index number to determine a secondary index number corresponding to the highest priority; and calculating the highest priority based on the primary index number and the secondary index number, and determining a control program corresponding to the highest priority.

9. The system according to claim 1, wherein the control programs running on the more than one of the plurality of physical cores have a same running period or different running periods.

10. The system according to claim 2, wherein the control programs running on the more than one of the plurality of physical cores have a same running period or different running periods.

11. The system according to claim 3, wherein the control programs running on the more than one of the plurality of physical cores have a same running period or different running periods.

12. An industrial server, comprising:

industrial server hardware; and an operating system kernel based on the industrial server hardware, wherein the operating system kernel supports a plurality of physical cores, wherein industrial server further comprises the control system for microkernel architecture of industrial server according to claim 1.

13. The industrial server according to claim 12, wherein the each microkernel further comprises:

an input/output, I/O, communication module, which is configured to, in the running process of the industrial control application, communicate with a terminal controlled by the industrial server based on a communication drive in the real-time operating system and a communication protocol in the industrial control middleware.

14. The industrial server according to claim 12, wherein the virtual machine monitor is specifically configured to:

calculate dependency among the plurality of control programs according to the microkernel task type weight and the microkernel task priority weight and/or the control program running time weight corresponding to the each control program; and generate the scheduling configuration information according to the dependency.

15. The industrial server according to claim 14, wherein the virtual machine monitor is specifically configured to:

calculate the dependency according to the microkernel task type weight, the microkernel task priority weight and the control program running time weight; or calculating the dependency according to the microkernel task type weight and the microkernel task priority weight; or calculating the dependency according to the microkernel task type weight and the control program running time weight.

16. The industrial server according to claim 12, wherein the virtual machine monitor is specifically configured to:

virtualize hardware through a virtual machine monitoring program, and configure more than one of the plurality of control programs on at least one of the plurality of physical cores according to the scheduling configuration information; and/or configure the scheduling algorithm for all the control programs running on the each physical core according to the scheduling configuration information, wherein the scheduling algorithm comprises a timetable-based scheduling algorithm or a priority-based scheduling algorithm; and/or virtualize the plurality of physical cores, obtaining at least two control programs from each of the at least one control program and configure the obtained at least two control programs originating from each of the at least one control program on more than one of the plurality of physical cores according to the scheduling configuration information.

17. The industrial server according to claim 12, wherein the virtual machine monitor is specifically configured to:
generate the scheduling configuration information according to a microkernel task type, and a microkernel task priority and/or a control program running time of the each control program by using a coarse-grained lock scheduling method, wherein in the coarse-grained lock scheduling method, the each physical core corresponds to one lock, one control program is determined from the control programs on a single one of the plurality of physical cores according to a timetable-based scheduling algorithm or a priority-based scheduling algorithm, the control program obtains the lock corresponding to the single one of the plurality of physical cores, exclusively occupies the single one of the plurality of physical cores, and executes a kernel mode operation; or generate the scheduling configuration information according to the microkernel task type, and the microkernel task priority and/or the control program running time of the each control programs by using a fine-grained lock scheduling method, wherein in the fine-grained lock scheduling method, the each physical core corresponds to the one lock, control programs are obtained from the one control program according to computing resources required by the at least one control program and are configured on respective ones of the plurality of physical cores according to dependency among the control programs, each of the control programs acquire a lock corresponding to the respective one of the plurality of physical cores running the each of the control programs, the control programs having locks currently execute the kernel mode operation on the respective ones of the plurality of physical cores running the control programs so as to be executed in parallel.

18. The industrial server according to claim 16, wherein the timetable-based scheduling algorithm comprises:
setting a plurality of timers, wherein a duration of a first timer is a main frame time, a second timer is sequentially started for each of a plurality of time windows within the main frame time, and a duration of the second timer is the same as a duration of each of the plurality of time windows successively; and scheduling the control programs according to a timetable while starting the first timer and the second timer with the main frame time as a period, scheduling a next one of the control programs once the second timer expires, and starting a next period once the first timer expires, wherein the timetable includes start time and end time of each of the plurality of time windows and the respective control programs corresponding to the plurality of time windows.

19. The industrial server according to claim 16, wherein the priority-based scheduling algorithm comprises:
traversing a priority primary index number bitmap to determine a primary index number corresponding to a highest priority;

traversing a priority secondary index number bitmap corresponding to the primary index number to determine a secondary index number corresponding to the highest priority; and calculating the highest priority based on the primary index number and the secondary index number, and determining a control program corresponding to the highest priority.

20. The industrial server according to claim 12, wherein the control programs running on the more than one of the plurality of physical cores have a same running period or different running periods.

* * * * *